United States Patent
Herchenroder et al.

(10) Patent No.: US 11,391,606 B2
(45) Date of Patent: Jul. 19, 2022

(54) FIXTURE FOR HOLDING A SENSOR, METHOD FOR MAKING SAID FIXTURE, AND METHOD FOR INSTALLING A SENSOR HARNESS

(71) Applicant: Gulfstream Aerospace Corporation, Savannah, GA (US)

(72) Inventors: Anthony Herchenroder, Savannah, GA (US); Doug Paul, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 0 days.

(21) Appl. No.: 16/516,941

(22) Filed: Jul. 19, 2019

(65) Prior Publication Data
US 2021/0018346 A1 Jan. 21, 2021

(51) Int. Cl.
*G01D 11/30* (2006.01)
*G01D 5/16* (2006.01)

(52) U.S. Cl.
CPC .............. *G01D 11/30* (2013.01); *G01D 5/16* (2013.01)

(58) Field of Classification Search
CPC ................................ G01D 11/30; G01D 5/16

USPC ........................................................ 73/866.5
See application file for complete search history.

(56) References Cited

U.S. PATENT DOCUMENTS

2009/0111015 A1* 4/2009 Wood .................... H01M 2/202
429/164

* cited by examiner

*Primary Examiner* — John Fitzgerald
*Assistant Examiner* — Rodney T Frank
(74) *Attorney, Agent, or Firm* — LKGlobal | Lorenz & Kopf LLP

(57) ABSTRACT

Fixtures for releasably holding a sensor having a first sensor portion and a second sensor portion, methods for making such fixtures, and methods for installing a sensor harness, are provided. In one example, a fixture includes a clip portion that is configured to hold a first sensor portion of a sensor. A support portion is coupled to and extends away from the clip portion. An arm portion is coupled to and extends away from the support portion. The arm portion is configured to hold a second sensor portion of the sensor. The fixture has a frangible seam formed therein that ruptures in response to an applied force for removing the fixture from the sensor.

17 Claims, 3 Drawing Sheets

FIXTURE FOR HOLDING A SENSOR, METHOD FOR MAKING SAID FIXTURE, AND METHOD FOR INSTALLING A SENSOR HARNESS

TECHNICAL FIELD

The technical field relates generally to sensors and sensor harnesses, and more particularly, relates to a fixture for releasably holding a sensor, for example to prevent relative movement between sensor portions of the sensor, a method for making such a fixture, and a method for installing a sensor harness using such a fixture.

BACKGROUND

Aircraft and other vehicles typically employ sensor harness assemblies that contain one or more sensors and associated electrical wiring. Such harnesses may be used, for example, in areas of an aircraft such as the landing gear or the like to provide positional data of the landing gear or other mechanical assembly to an avionics system.

Installation of sensor harnesses in the aircraft or other vehicle typically requires that the sensor(s) on the sensor harness be held in a predetermined mechanical relationship to the measured component(s), e.g., landing gear component(s) or the like. Additionally, the sensor needs to be simultaneously held at a predetermined electrical position that represents the mechanical position. As such, when a technician(s) installs a sensor harness, the technician(s) will precisely set both the mechanical and electrical positions of the sensor(s) simultaneously with installing the component(s) to be measured by the sensor(s). Unfortunately, this approach is labor intensive and can result in a significant amount of down time of the aircraft and further, may be very susceptible to human error.

Accordingly, it is desirable to provide a device that can be used to efficiently hold a sensor(s) in predetermined mechanical and electrical positions, for example, during installation of a sensor harness, and methods for making such a device, and methods for installing a sensor harness using such a device. Furthermore, other desirable features and characteristics of the various embodiments described herein will become apparent from the subsequent detailed description and the appended claims, taken in conjunction with the accompanying drawings and this background.

SUMMARY

Various non-limiting embodiments of a fixture for releasably holding a sensor having a first sensor portion and a second sensor portion, various non-limiting embodiments of a method for making a fixture for releasably holding a sensor, and various non-limiting embodiments of a method for installing a sensor harness, are provided herein.

In a first non-limiting embodiment, the fixture includes, but is not limited to, a clip portion that is configured to hold the first sensor portion. The fixture further includes, but is not limited to, a support portion that is coupled to and extends away from the clip portion. The fixture further includes, but is not limited to, an arm portion that is coupled to and extends away from the support portion. The arm portion is configured to hold the second sensor portion. The fixture has a frangible seam formed therein that ruptures in response to an applied force for removing the fixture from the sensor.

In another non-limiting embodiment, the method for making the fixture includes, but is not limited to, forming a clip portion of the fixture configured to hold the first sensor portion. The method further includes, but is not limited to, forming a support portion of the fixture coupled to and extending away from the clip portion. The method further includes, but is not limited to, forming an arm portion of the fixture coupled to and extending away from the support portion. The arm portion is configured to hold the second sensor portion. At least one of forming the clip portion, the support portion, and the arm portion includes forming a frangible seam in the fixture. The frangible seam is configured to ruptures in response to an applied force for removing the fixture from the sensor.

In another non-limiting embodiment, the method for installing the sensor harness includes, but is not limited to, holding a first sensor portion of a sensor with a clip portion of a fixture. The sensor forms part of the sensor harness. The method further includes, but is not limited to, holding a second sensor portion of the sensor with an arm portion of the fixture. The fixture further includes, but is not limited to, a support portion coupled to and extending between the clip portion and the arm portion. The fixture has a frangible seam formed therein. The method further includes, but is not limited to, installing the sensor harness in an aircraft while the sensor is held in the fixture such that relative movement between the first sensor portion and the second sensor portion is substantially prevented. The method further includes, but is not limited to, applying a force to the fixture to rupture the frangible seam for removing the fixture from the sensor.

BRIEF DESCRIPTION OF THE DRAWINGS

The various embodiments will hereinafter be described in conjunction with the following drawing figures, wherein like numerals denote like elements, and wherein.

DETAILED DESCRIPTION

Figure 1:
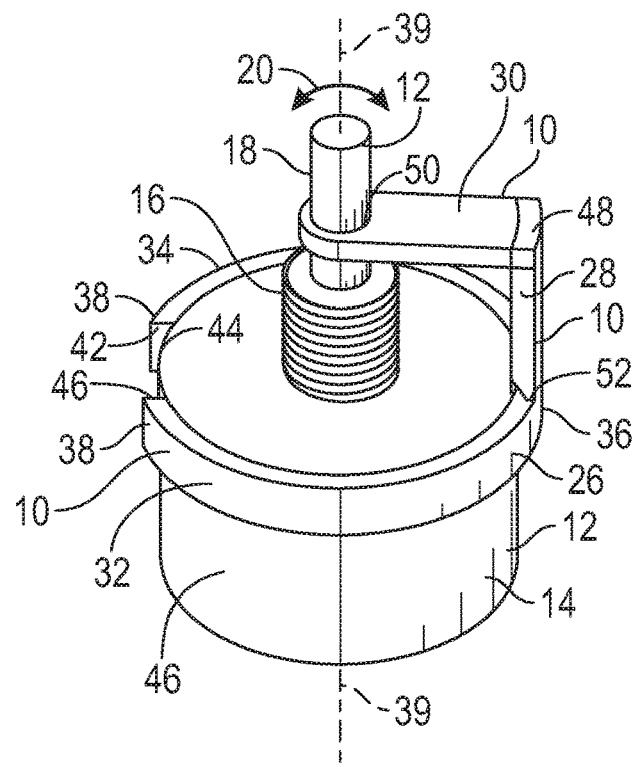
FIG. 1 illustrates a perspective view of a fixture holding a sensor in accordance with an exemplary embodiment.

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to fixtures for releasably holding a sensor having a first sensor portion and a second sensor portion, methods for making such fixtures, and methods for installing a sensor harness. The fixture includes a clip portion that holds the first sensor portion. The fixture further includes a support portion that is coupled to and extends away from the clip portion, and an arm portion that is coupled to and extends away from the support portion. The arm portion holds the second sensor portion. The fixture has a frangible seam formed therein that ruptures in response to an applied force for removing the fixture from the sensor.

In an exemplary embodiment, the sensor forms part of a sensor harness that is installed in an aircraft with a component to be measured by the sensor (e.g., a landing gear component(s) or the like) while the sensor is held in the fixture such that relative movement between the first sensor portion and the second sensor portion is substantially prevented. In an exemplary embodiment, the position of the first sensor portion defines a mechanical position of the sensor relative to the component to be measured while the second sensor portion of the sensor is movable relative to the first sensor portion to define an electrical position of the sensor. Advantageously, by holding the sensor in the fixture and preventing relative movement between the first and second sensor portions, the sensor harness can be efficiently installed in the aircraft together with the component(s) to be measured by the sensor with both the mechanical and electrical positions of the sensor already set in predetermined positions. In an exemplary embodiment, once installed, a force may be applied, for example by a technician, to rupture the frangible seam, thereby splitting or otherwise breaking the fixture into multiple pieces so that the fixture can be efficiently and easily removed from the sensor.

Referring to FIGS. 1-5, a fixture 10 for releasably holding a sensor 12 is provided. The sensor 12 includes a sensor body portion 14, a sensor threaded portion 16, and a sensor shaft portion 18. The sensor shaft portion 18 is coupled to the sensor threaded portion 16, which is rotationally coupled to the sensor body portion 14, allowing the sensor shaft portion 18 to rotate or otherwise move relative to the sensor body portion 14 in a clockwise and/or counterclockwise direction(s) (indicated by double headed arrow 20). As will be discussed in further detail below, in an exemplary embodiment, the sensor 12 is a potentiometer that includes one or more resistors that are in communication with the sensor shaft portion 18 to provide positional information regarding a component 22 that is installed, for example, in an area of an aircraft 24.

The fixture 10 includes a clip portion 26, a support portion 28 coupled to and extending away from the clip portion 26, and an arm portion 30 coupled to and extending away from the support portion 28. As illustrated, the clip portion 26 is sized or otherwise configured to hold the sensor body portion 14 and the arm portion 30 is configured to hold the sensor shaft portion 18.

In an exemplary embodiment, the clip portion 26 includes legs 32 and 34 that extend outward from an intermediate section 36 of the clip portion 26 in generally opposing directions along a plane 37 circumferentially about a central axis 39 to define a ring 38. As illustrated, the legs 32 and 34 have distal ends 40 and 42, respectively, that are spaced apart to form an open ring with a gap 44 formed therebetween. The ring 38 is sized such that the clip portion 26 holds the sensor body portion 14 in an interference or friction fit to prevent relative movement between the clip portion 26 and the sensor body portion 14. In an exemplary embodiment, the legs 32 and 34 of the clip portion 26 can be moved generally outward to expand the gap 44 and the space between the legs 32 and 34 so that the clip portion 26 can be arranged about the outer surface 46 of the sensor body portion 14. Once in position, the legs 32 and 34 are allowed to move back inwardly to narrow the gap 44 and the space between the legs 32 and 34 to tightly engage the outer surface 46 and form a friction fit between the clip portion 26 and the sensor body portion 14.

As illustrated, the support portion 28 is elongated extending distally from the intermediate section 36 of the clip portion 26 substantially transverse (e.g., substantially perpendicular) to the plane 37. The arm portion 30 is elongated extending from a distal end section 48 of the support portion 28 substantially parallel to the plane 37 spaced apart from the clip portion 26. The arm portion 30 has an arm opening 50 formed therethrough that is configured for receiving and holding the sensor shaft portion 18 of the sensor 12. In an exemplary embodiment, the arm opening 50, for example a center of the arm opening 50, is substantially aligned with the central axis 39 of the clip portion 26. In an exemplary embodiment, the arm opening 50 is sized such that the arm portion 30 tightly holds the sensor shaft portion 18 of the sensor 12, forming an interference or friction fit to prevent relative movement between the arm portion 30 and the sensor shaft portion 18. Further, as the support portion 28 is coupled to both the clip portion 26 and the arm portion 30, advantageously, the friction fit between the clip portion 26 and the sensor body portion 14 of the sensor 12 and the friction fit between the arm portion 30 and the sensor shaft portion 18 of the sensor 12 substantially prevents relative movement between the sensor body portion 14 and the sensor shaft portion 18.

The fixture 10 has a frangible seam 52 formed therein that ruptures in response to an applied force to split or otherwise break the fixture 10 into multiple pieces for removing the fixture 10 from the sensor 12. As illustrated, the frangible seam 52 is arranged in the support portion 28 proximate an interface between the clip portion 26 and the support portion 28. Alternatively, the frangible seam 52 may be located in other areas of the fixture 10, such as, for example, in the clip portion 26, other areas of the support portion 28, the arm portion 30, an interface between the clip portion 26 and the support portion 28, and/or an interface between the support portion 28 and the arm portion 30.

In an exemplary embodiment, the fixture 10 includes at least one additional frangible seam 54 that ruptures in response to the applied force. Likewise, the additional frangible seam(s) 54 may be arranged in the clip portion 26, the support portion 28, the arm portion 30, an interface between the clip portion 26 and the support portion 28, and/or an interface between the support portion 28 and the arm portion 30.

In an exemplary embodiment, the frangible seam(s) 52 and 54 is defined by negative feature(s) 56 (e.g., notch or the like) that locally reduces the wall stock of the fixture 10 to produce a stress riser that concentrates the stresses produce when a force is applied to the fixture 10 to define predetermined breakpoints in the fixture 10. Alternatively and/or additionally, the frangible seam(s) 52 and 54 may be formed in the fixture 10 by using an additive process, e.g., 3-D printing or the like, which can produce weakened interfaces between the deposited layers that form the fixture 10. Without being limited by theory, in an exemplary embodiment, the weakened interface(s) between two or more deposited adjacent layers may form stress risers in the fixture 10 that facilitate breaking the fixture 10 along the determined breakpoints when a force is applied to the fixture 10. As will be discussed in further detail below, the fixture 10 including the clip portion 26, the support portion 28, and the arm portion 30, may be formed of a plastic material, such as a 3-D printable thermoplastic material, for example acrylonitrile butadiene styrene (ABS), polylactic acid (PLA), or the like.

Figure 3:
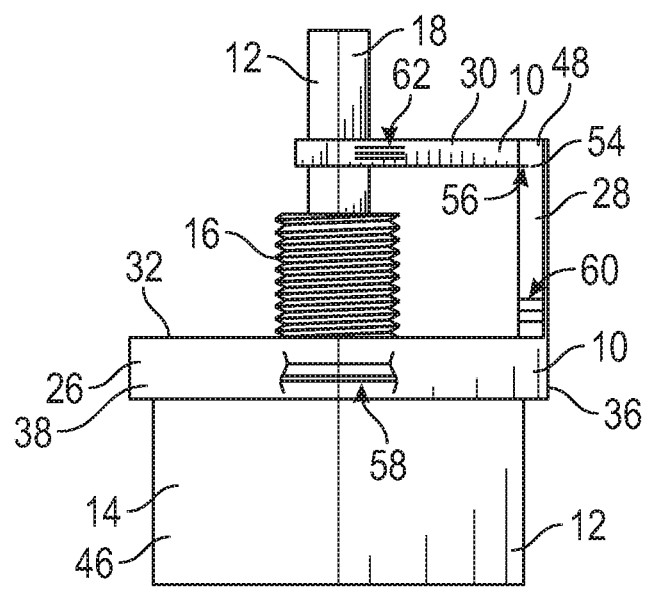
FIG. 3 illustrates a side view of a fixture holding a sensor in accordance with an exemplary embodiment.
Figure 6:
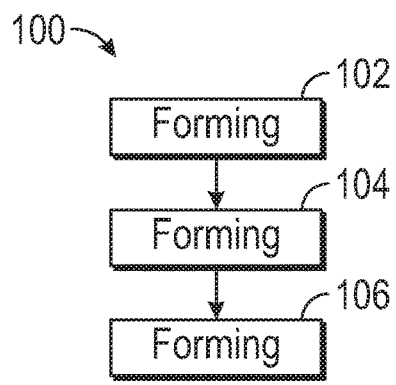
FIG. 6 illustrates a method for making a fixture for releasably holding a sensor in accordance with an exemplary embodiment.

Referring to FIGS. 3 and 6, a method 100 for making the fixture 10 in accordance with an exemplary embodiment is provided. The method 100 includes forming (STEP 102) the clip portion 26 of the fixture 10 configured to hold the sensor body portion 14 of the sensor 12. In an exemplary embodiment, an additive process is used to form the fixture 10 including forming the clip portion 26. In one example, the additive process is a 3-D printing process, such as, for example, a fused deposition modeling (FDM) process. A FDM process uses a thermoplastic material (e.g., a 3-D printable thermoplastic material as discussed above or the like), which is heated to its melting point and then extruded, layer by layer, to create a 3-D object. In an exemplary embodiment, forming the clip portion 26 includes depositing a plurality of layers 58 of the 3-D printable thermoplastic material to form a stack of layers that define the clip portion 26.

The method 100 further includes forming (STEP 104) the support portion 28 coupled to and extending away from the clip portion 26. In an exemplary embodiment, the additive process is used to form the support portion 28. In one example, forming the support portion 28 includes depositing a plurality of layers 60 of the 3-D printable thermoplastic material to form a stack of layers that define the support portion 28.

The method 100 further includes forming (STEP 106) the arm portion 30 couple to and extending away from the support portion 28 and configured to hold the sensor shaft portion 18. In an exemplary embodiment, the additive process is used to form the arm portion 30. In one example, forming the arm portion 30 includes depositing a plurality of layers 62 of the 3-D printable thermoplastic material to form a stack of layers that define the arm portion 30. In an exemplary embodiment and as discussed above, the frangible seam(s) 54 and/or 56 may be formed in the fixture 10 using the additive process, which may produce weakened interfaces between adjacent layers of the deposited layers 58, 60, and/or 62, and/or to form the negative feature(s) 56.

Figure 2:
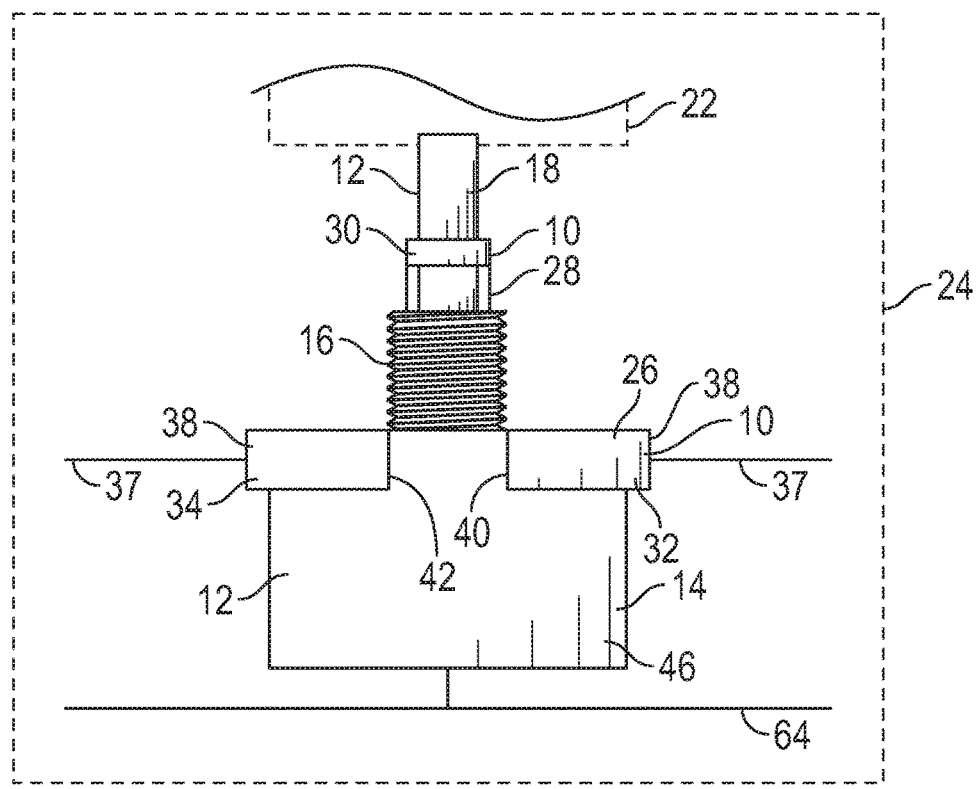
FIG. 2 illustrates a front view of a fixture holding a sensor that forms part of a sensor harness installed in an aircraft in accordance with an exemplary embodiment.
Figure 4:
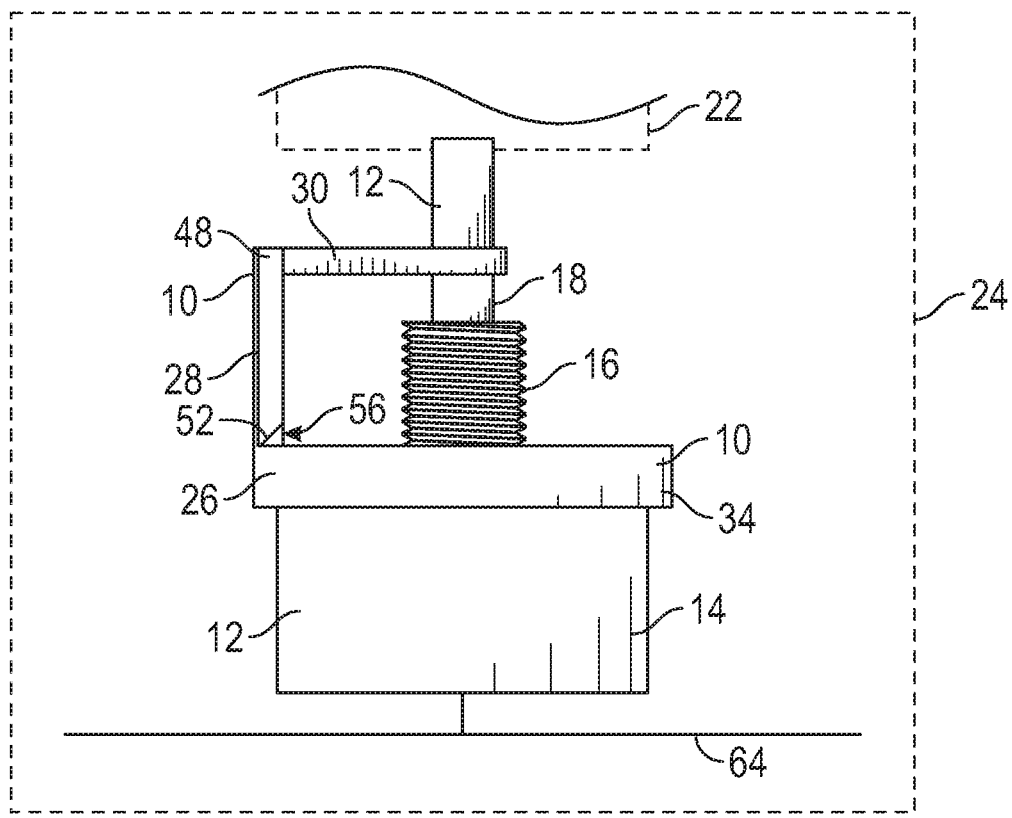
FIG. 4 illustrates a side view of a fixture holding a sensor that forms part of a sensor harness installed in an aircraft in accordance with an exemplary embodiment.
Figure 5:
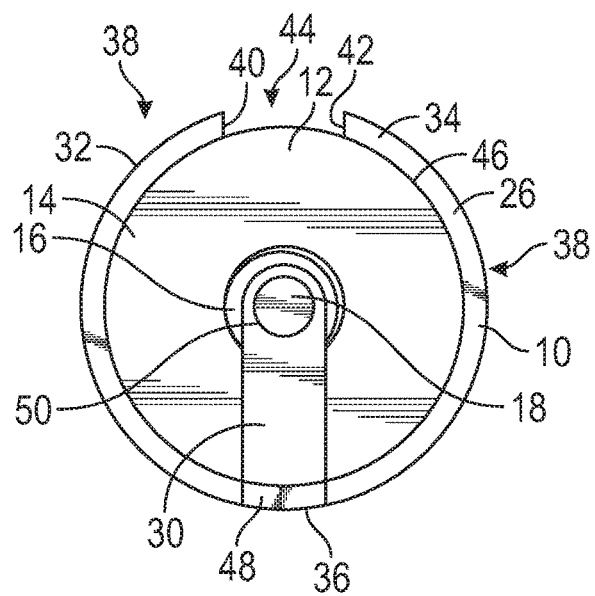
FIG. 5 illustrates a top view of a fixture holding a sensor in accordance with an exemplary embodiment.
Figure 7:
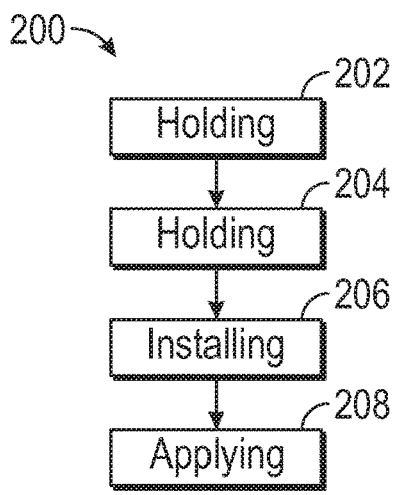
FIG. 7 illustrates a method for installing a sensor harness in accordance with an exemplary embodiment.

Referring to FIGS. 2, 4, and 7, a method 200 for installing a sensor harness 64 that includes the sensor 12 in accordance with an exemplary embodiment is provided. The method 200 includes holding (STEP 202) the sensor body portion 14 of the sensor 12 with the clip portion 26 of the fixture 10. The sensor shaft portion 18 is held (STEP 204) with the arm portion 30 of the fixture 10.

In an exemplary embodiment, the sensor harness 64 is installed (STEP 206) in the aircraft 24 while the sensor 12 is held in the fixture 10. In one example, the sensor harness 64 is installed in the aircraft 24 together with the component 22 to be measure by the sensor 12 with the sensor body portion 14 and the sensor shaft portion 18 positionally fixed by the clip portion 26 and the arm portion 30, respectively, in predetermined mechanical and electrical positions. In an exemplary embodiment, once the sensor harness 64 is installed in the aircraft 24, a force is applied (STEP 208) to the fixture 10 to rupture the frangible seam(s) 52 and/or 54 for removing the fixture 10 from the sensor 12.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A fixture for releasably holding a sensor having a first sensor portion and a second sensor portion that is moveable relative to the first sensor portion, the fixture comprising:
   a clip portion configured to hold the first sensor portion;
   a support portion coupled to and extending away from the clip portion; and
   an arm portion coupled to and extending away from the support portion, wherein the arm portion is configured to receive and directly hold the second sensor portion while the clip portion holds the first sensor portion spaced apart from the second sensor portion to prevent relative movement between the first and second sensor portions, and wherein the support portion has a frangible seam formed therein that ruptures in response to an applied force for removing at least a portion of the fixture from the sensor to allow relative movement between the first and second sensor portions.

2. The fixture of claim 1, wherein the clip portion includes a first leg and a second leg that extend generally along a first plane to define a ring for holding the first sensor portion.

3. The fixture of claim 2, wherein the first leg has a first distal end and the second leg has a second distal end that is spaced apart from the first distal end to define the ring configured as an open ring with a gap formed the first and second distal ends.

4. The fixture of claim 2, wherein the support portion is elongated extending from the clip portion substantially transverse to the first plane.

5. The fixture of claim 4, wherein the arm portion is elongated extending from the support portion substantially parallel to the first plane.

6. The fixture of claim 4, wherein the arm portion has an arm opening formed therethrough for receiving the second sensor portion.

7. The fixture of claim 6, wherein the ring has a central axis extending therethrough, and a center of the arm opening is substantially aligned with the central axis.

8. The fixture of claim 6, wherein the ring is sized such that the clip portion holds the first sensor portion in a first friction fit and the arm opening is sized such that the arm portion holds the second sensor portion in a second friction fit, to thereby prevent relative movement between the first sensor portion and the second sensor portion.

9. The fixture of claim 1, wherein the fixture has at least one additional frangible seam formed therein that ruptures in response to the applied force.

10. The fixture of claim 1, wherein the frangible seam is defined by at least one negative feature formed in the fixture.

11. The fixture of claim 1, wherein the clip portion, the support portion, and the arm portion are integrally formed and comprise a 3-D printable thermoplastic material.

12. The fixture of claim 11, wherein the 3-D printable thermoplastic material comprises one of acrylonitrile butadiene styrene (ABS) and polylactic acid (PLA).

13. A method for installing a sensor harness, the method comprising the steps of:
  providing a fixture according to claim 1;
  holding a first sensor portion of a sensor with the clip portion of the fixture, wherein the sensor forms part of the sensor harness;
  directly holding a second sensor portion of the sensor with the arm portion of the fixture while the clip portion holds the first sensor portion spaced apart from the second sensor portion to prevent relative movement between the first and second sensor portions;
  installing the sensor harness in an aircraft while the sensor is held in the fixture such that relative movement between the first sensor portion and the second sensor portion is substantially prevented; and
  applying a force to the fixture to rupture the frangible seam for removing at least a portion of the fixture from the sensor to allow relative movement between the first and second sensor portions.

14. A method for making a fixture for releasably holding a sensor having a first sensor portion and a second sensor portion that is moveable relative to the first sensor portion, the method comprising the steps of:
  forming a clip portion of the fixture configured to hold the first sensor portion;
  forming a support portion of the fixture coupled to and extending away from the clip portion;
  forming an arm portion of the fixture coupled to and extending away from the support portion and configured to receive and directly hold the second sensor portion while the clip portion holds the first sensor portion spaced apart from the second sensor portion to prevent relative movement between the first and second sensor portions, wherein at least one of forming the clip portion, the support portion, and the arm portion includes forming a frangible seam in the support portion, and wherein the frangible seam is configured to ruptures in response to an applied force for removing at least a portion of the fixture from the sensor to allow relative movement between the first and second sensor portions.

15. The method of claim 14, wherein forming the clip portion comprises forming the clip portion using an additive process, wherein forming the support portion comprises forming the support portion using the additive process, and wherein forming the arm portion comprises forming the arm portion using the additive process.

16. The method of claim 15, wherein the additive process is a 3-D printing process and forming the clip portion comprises depositing a first plurality of layers of a 3-D printable thermoplastic material to form a first stack of layers defining the clip portion, wherein forming the support portion comprises depositing a second plurality of layers of the 3-D printable thermoplastic material to form a second stack of layers defining the support portion, and wherein forming the arm portion comprises depositing a third plurality of layers of the 3-D printable thermoplastic material to form a third stack of layers defining the arm portion.

17. The method of claim 16, wherein the 3-D printable thermoplastic material comprises one of acrylonitrile butadiene styrene (ABS) and polylactic acid (PLA).

* * * * *